United States Patent [19]
Charney

[11] 3,771,258
[45] Nov. 13, 1973

[54] CONVEYORIZED FARMING SYSTEM

[76] Inventor: Andrew Charney, 7484 Affeldt, Westland, Mich. 48185

[22] Filed: May 10, 1971

[21] Appl. No.: 141,894

[52] U.S. Cl............................ 47/1.2, 47/17, 47/58
[51] Int. Cl............................................. A01g 9/18
[58] Field of Search........................... 47/1.2, 17, 58

[56] References Cited
UNITED STATES PATENTS

| | | | |
|---|---|---|---|
| 1,753,980 | 4/1930 | Baumgartner | 47/17 |
| 1,793,626 | 2/1931 | McCormick | 47/1.2 X |
| 3,276,163 | 10/1966 | Oepen et al. | 47/1.2 |
| 3,292,305 | 12/1966 | Stengel | 47/1.1 |
| 3,324,593 | 6/1967 | Strasser | 47/17 X |
| 3,327,425 | 6/1967 | Dosedla et al. | 47/1.2 |
| 3,579,907 | 5/1971 | Graves | 47/17 |
| 3,606,697 | 9/1971 | Edgen | 47/17 |

*Primary Examiner*—Edgar S. Burr
*Attorney*—Barnard, McGlynn & Reising

[57] ABSTRACT

Farming is conducted by planting crops in soil carried by pallets connected together in an endless chain and moved around a serpentine-like trackway, the major length of which is laid out over external terrain so that the contents of the pallets may be exposed to the sun and weather for nurturing and growth of the crops, and all planting, soil treatment and harvesting operations are performed at a central work area extending along a relatively short section of the trackway.

9 Claims, 8 Drawing Figures

INVENTOR.
Andrew Charney
BY
Barnard, McGlynn & Reising
ATTORNEYS

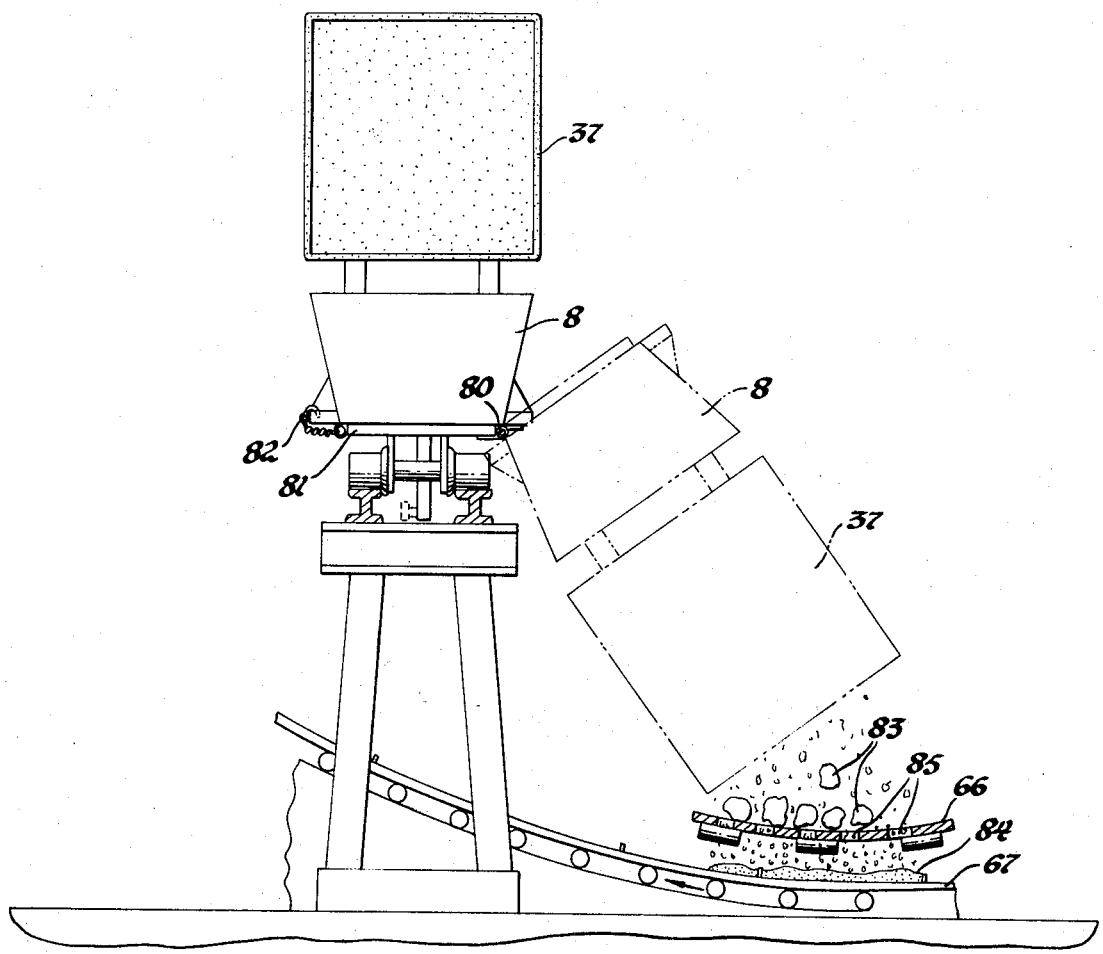
Fig.5
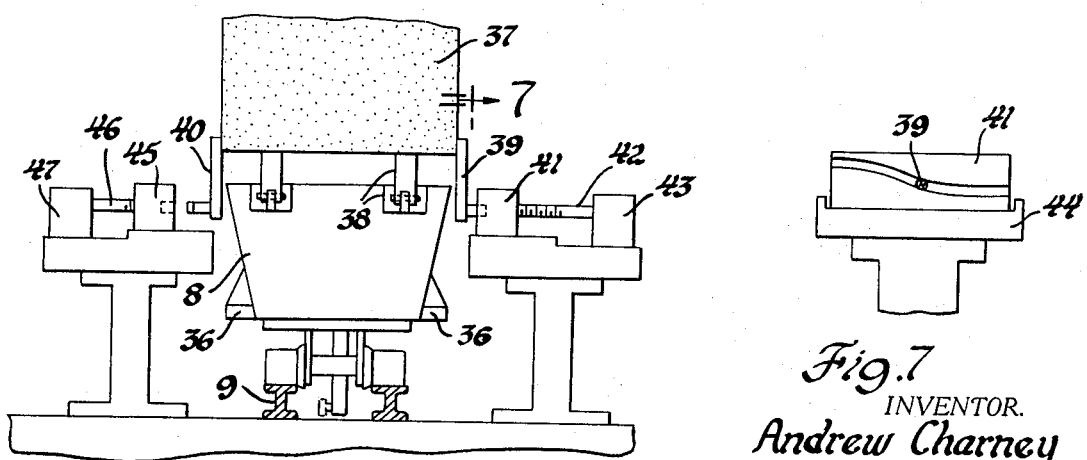
Fig.6
Fig.7
INVENTOR.
Andrew Charney
BY
Barnard, McGlynn & Reising
ATTORNEYS

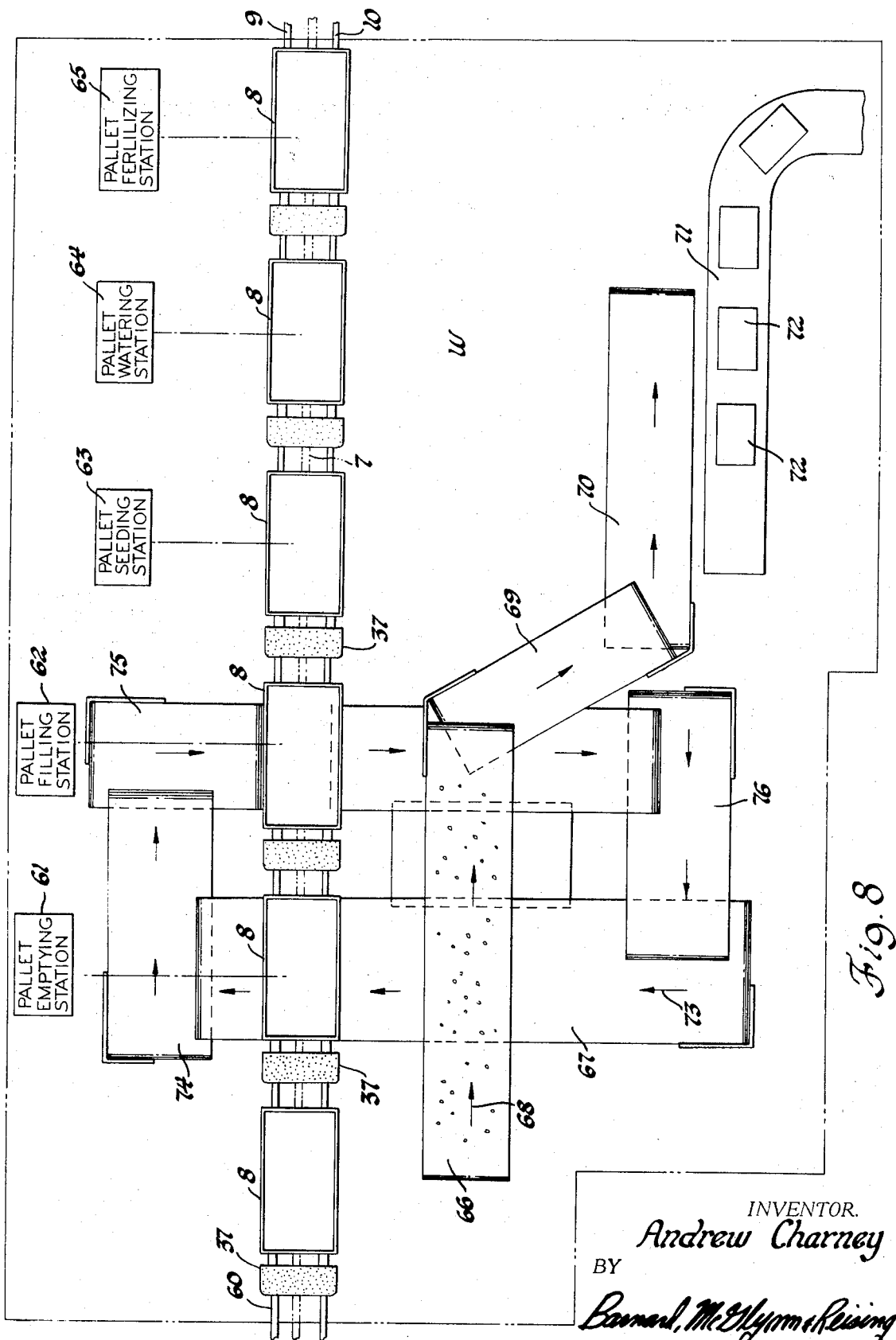

CONVEYORIZED FARMING SYSTEM

BACKGROUND OF THE INVENTION

This invention relates to farming, and particularly to an improved system and method of farming which both expedites the growing of crops and reduces the cost thereof. In conventional farming, all materials, equipment and labor required for the growing of crops must be carried out onto and around the relatively extensive growing area of the "farm," and the crops when grown must be brought back off the growing area for shipment.

SUMMARY OF THE INVENTION

My invention in its broadest aspect reverses this process by instead bringing the growing area, so to speak, into a central work area where the materials, machinery and labor for working the soil are located. More specifically, in accordance with the invention, the crops are grown in soil or other crop-nurturing medium on an endless conveyor-like means which traverses a prescribed course, at least the major portion of which extends over uncovered terrain, and a relatively short portion extends through a work area wherein the farming operations of planting and harvesting of the crops, watering, fertilizing, etc. are performed.

Many advantages will readily be seen to result from the invention. For example, production line methods may be employed in the central work area, using efficient, modern material handling equipment. Also since the size of this central area required for operating such equipment and placement of such manual labor necessary to supplement machine operations is relatively small, it may be enclosed within a building, thus enabling those operations to be carried on irrespective of outdoor weather conditions. Further, the elevation of the soil and crop carrying conveyor within such central work area may be placed at the most convenient and comfortable levels for the hand labor operations. Thus, the time consuming and expensive harvesting of delicate crops, such as strawberries, potatoes grown for manufacture of potato chips, etc. by conventional methods out in the field, involving hand picking by laborers stooping over the plants, is avoided in accordance with my invention since the soil containing grown crops may conveniently be dumped onto a perforated belt-type conveyor whose perforations are small enough to retain the plants but allow the soil to pass therethrough onto an imperforate lower belt which may convey the soil back to the main conveyor like means.

Also, by constructing such main conveyor in the form of an endless train of individual soil-carrying pallets, the crops growing therein may be protected from excessive exposure to sun and damaging rain, hail, etc. by equipping the pallets with covers. These covers may be selectively opened and closed by cover-actuating means located out in the crop-growing area along the course or trackway of the pallets. A conventional conveyor-type chain may be used, to which the pallets are connected, the chain being laid out over a serpentine-like route consisting of various loop sections having turn areas at each end with a sprocket engaging the chain. Motors connected to certain or each of these sprockets may conveniently serve as the driving means for the chain and its connected pallets, and the sprockets may be adjustably mounted and spring biased to take up slack and maintain the necessary tension of the chain. Also, heating means, such as electric resistance elements, may be provided in the covers for maintaining temperatures sufficiently within the pallets for proper growing of crops during cold weather seasons. Additional inner, perforated or screen-like covers may also be placed on the pallets to protect the soil and crops from insects, birds, etc.

Another advantage made possible by this invention is that the problem of soil erosion incident to conventional farming is substantially eliminated. Also, since the soil to be used is not limited to that existing in the particular locality where the invention is to be applied, but rather can be obtained elsewhere or "manufactured" to obtain the most desired composition, and then used only in the quantities required to provide soil beds in the pallets, farming can thus be carried out in localities which would not be suitable using conventional methods and equipment.

BRIEF DESCRIPTION OF THE PRIOR ART

The nearest approach to such a system and method in the prior art of which I am aware is that disclosed in the U.S. Pat. No. 1,753,980 to Baumgartner wherein plant growing containers are movable on tracks from the interior of a greenhouse, in which soil treatment and/or harvesting operations are performed, to an outside growing area where they may be parked on a series of spur tracks. There is no suggestion therein, however, of employing an endless soil-carrying conveyor extending out around an extended area, such as represented by a conventional farm, and thence back through a work area, completing the circuit. Hydroponic systems are, of course, also old, employing conveyorized screens or soil containers, and in which all operations, including plant growth, are carried on within a building. Representative of such systems are the disclosures in U.S. Pat. Nos. 2,244,677; 3,254,447; 3,254,448; 3,276,163; 3,284,948; 3,300,896; 3,324,593; 3,327,425; 3,425,158; 3,432,965; and 3,529,379.

The advantages and distinguishing features of this invention over all such prior art will be better understood from the following description, having reference to the drawings, wherein:

BRIEF DESCRIPTION OF THE DRAWINGS

Figure 1:
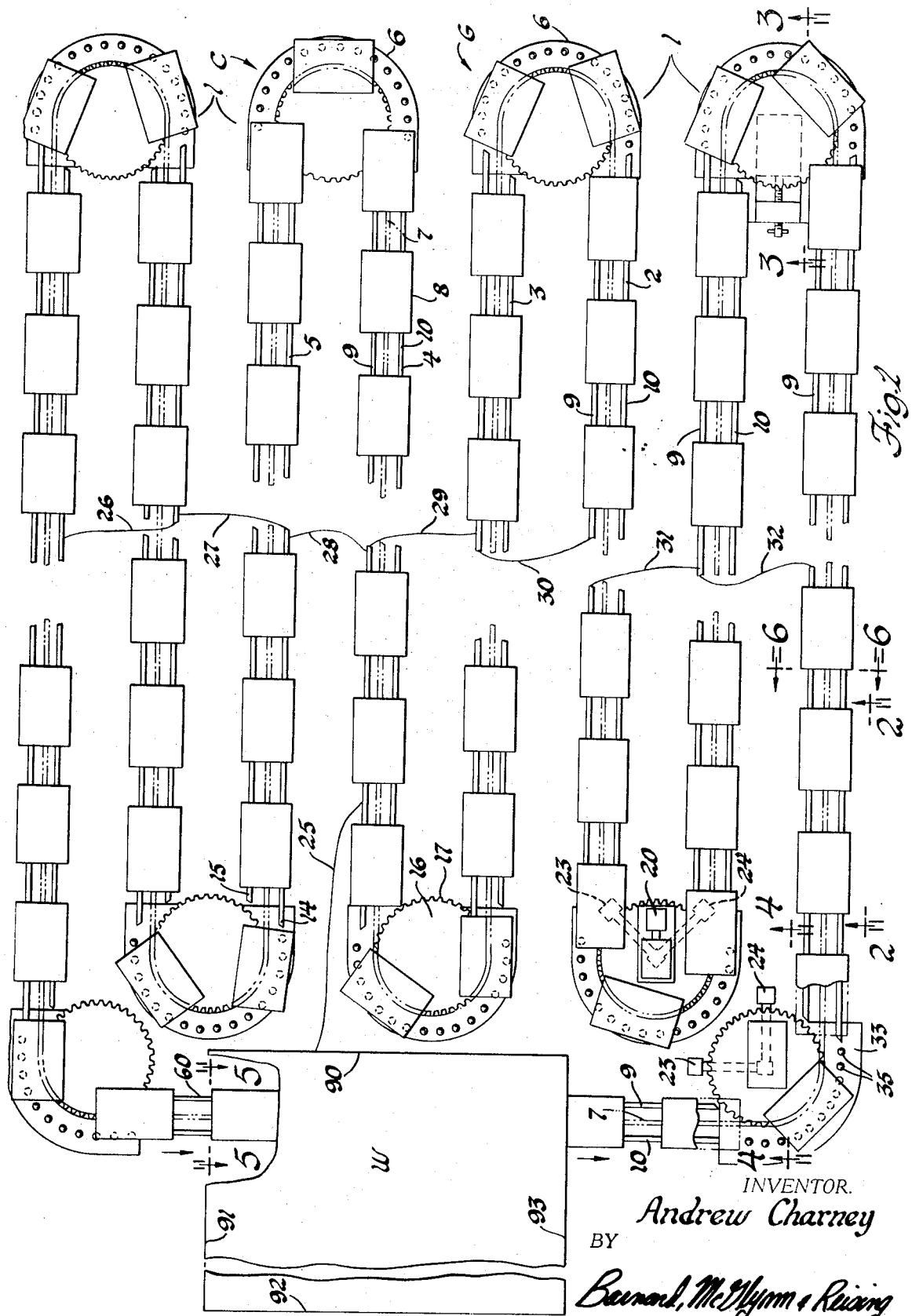
FIG. 1 is a plan view of a conveyorized farming system constructed in accordance with the invention.

FIG. 5 is a somewhat further enlarged fragmentary view, taken in the direction of the arrows on line 5—5 of FIG. 1, showing the pallet dumping station within the building which preferably encloses the central work area.

FIG. 6 is an enlarged fragmentary sectional view, taken transversely of the external trackway along substantially the line 6—6 of FIG. 1, schematically illustrating the actuating means for opening and closing the outer covers with which the pallets may be equipped.

FIG. 7 is a further enlarged, detailed view of one of these cover actuating cams, as seen looking in the direction of the arrows 7—7 of FIG. 6.

FIG. 8 is an enlarged plan view of the portion of the trackway which extends through the central work area shown in FIG. 1.

DESCRIPTION OF A PREFERRED EMBODIMENT

Referring now in detail to the drawings, a farming system is disclosed which basically includes an outdoor crop growing area designated generally by the letter G; a central work area designated generally by the letter W in which substantially all operations such as planting, soil treatment and harvesting are performed; and an endless soil-carrying conveyor means designated generally by the letter C, which traverses throughout both the areas A and W. The crop growing area G is preferably laid out over an extensive acreage of external terrain, with the conveyor means C extending therearound along a serpentine-like, generally horizontal route comprising various loop sections 1. The number of such loop sections and the direction at which they extend in relation to each other will, of course, be selected in accordance with the size and topography of the area G. As illustrated, however, each loop section comprises a pair of trackways 2 and 3, 3 and 4, 4 and 5, etc., each being laid out straight, as shown, or curved as desired, or required by the topography of the terrain, with each such pair of adjacent trackways having their respective adjacent ends interconnected by a turn area 6. Also, in the embodiment illustrated, the conveyor like means C comprises an endless conveyor chain 7 interconnecting a series of pallets 8 spaced longitudinally therealong and mounted on spaced, parallel rails 9 and 10 defining each of the trackways.

Figure 3:
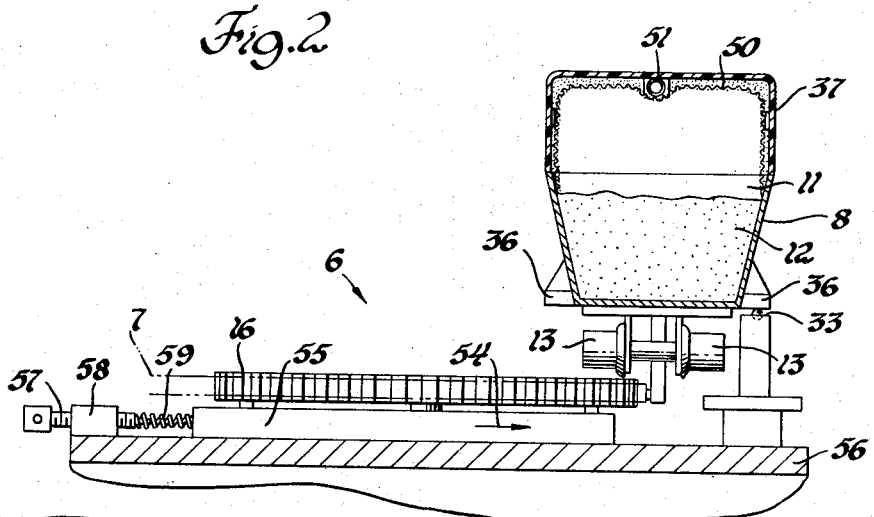
FIG. 3 is an enlarged fragmentary sectional view taken substantially along the line 3—3 of FIG. 1, showing further details of one of the pallets and schematically illustrating the arrangement for taking up slack in the conveyor at one of the turn areas on the serpentine-line route along which the growing of the crops takes place.
Figure 4:
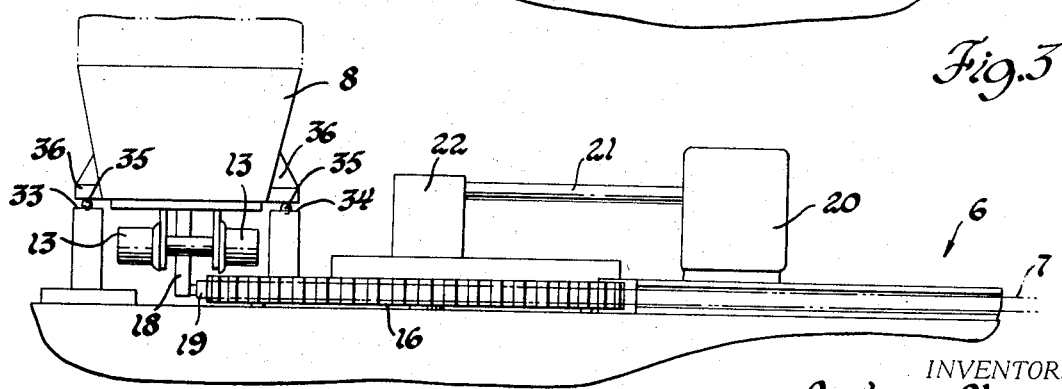
FIG. 4 is another enlarged fragmentary sectional view, taken substantially along the line 4—4 of FIG. 1, showing a means for driving the conveyor and for supporting the pallets at a turn area.

The pallets 8, as best shown in FIG. 3, form upwardly open chambers 11 for carrying a bed 12 of crop-growing soil. Rollably supporting each pallet is an undercarriage comprising wheels 13 engagable with the tracks 9 and 10 of each trackway. The rails terminate, as best shown at 14 and 15 in FIG. 1, adjacent a sprocket 16 in each turn area, which sprocket has teeth 17 in meshing engagement with the chain 7. The pallets are shown connected to the chain by a depending arm 18 extending downwardly from the pallet undercarriage, the lower end of the arm being suitably secured, as best shown in FIG. 4, to a lug 19 in the chain which is receivable between adjacent sprocket teeth 17. FIG. 4 also illustrates suitable driving means for the chain in the form of an electric motor 20 connected through a shaft 21 and transmission or other suitable speed reduction means 22 whose output shaft (not shown) extends coaxially of and is directly connected to the sprocket 16. Each of the sprockets is supported for rotation on suitable foundation members, such as indicated at 23 and 24 in FIG. 1, and it will be appreciated that each such sprocket may be individually driven by a separate driving means 20, 21, 22 as described. Electric power for operating the motors 20 may be supplied from the central work area W by a suitable insulated conductor 25 connected to one of the rails of a trackway such as that designated by the numeral 4, to which one of the rails of each of the other trackways is connected by jumper leads 26, 27, 28, 29, 30, 31, 32.

At each turn area, as best shown in FIG. 4, a stationary support is provided having an upper annular area 33 extending radially outward from the sprocket 16, and mounted for rotation with the sprocket is a cooperating member having an upper face 34 at the same elevation. Antifriction elements, such as balls 35, are recessed in these surfaces 33 and 34 so as to underlie and rollably support the outboard and inboard sides, respectively, of each successive pallet 8 during its travel around the turn area, i.e., during the interval between disengagement of its wheels 13 with the ends of the rails of one trackway and their reengagement with the rails of the adjacent trackway. Although not shown, the sprocket carried surface member 34 is duplicated on each sprocket by one or more like members in circumferentially equally spaced relation thereto about the axis of the sprocket so that one such surface 34 will underlie the inboard side of each successive pallet during its movement around the turn area. Also, while the underside of each pallet could be made wide enough so as to engage the anti-friction ball elements 35 directly, in the arrangement shown, the inboard and outboard sides of the pallets are provided with outrigger members 36 for such purpose.

Figure 2:
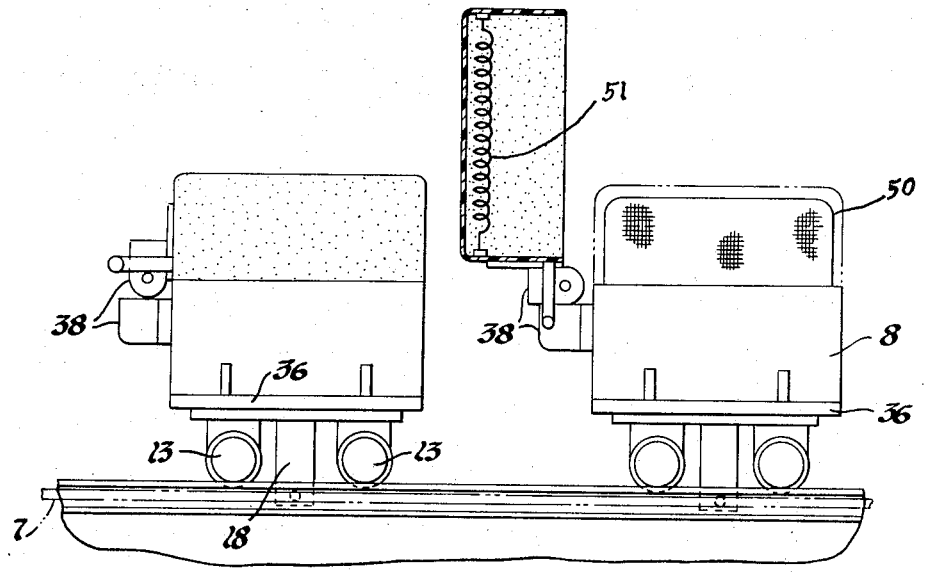
FIG. 2 is an enlarged fragmentary side elevational view, taken in the direction of the arrows 2—2 of FIG. 1, showing two of the soil carrying pallets on a portion of the external trackway, one of the pallets having its crop protecting cover in raised position, with parts thereof being broken away and in section.

As best shown in FIGS. 2, 3 and 7, each pallet is preferably provided with an outer imperforate cover 37 for the top thereof, which cover is swingable upwardly to an open position at one end of the pallet. Suitable hinge means interconnecting the covers and pallets for this purpose are shown at 38. Since it is desirable to selectively actuate these outer covers 37 to and from their open and closed positions, respectively, suitable means is provided therefor which is adapted for remote control from the central work area W. This is schematically illustrated in FIGS. 6 and 7, wherein each such cover 37 is provided with an opening cam follower 39 and a closing cam follower 40. Each opening cam follower 39 is selectively engageable with a cover-opening cam 41 which is selectively movable into or out of position thereof by its threaded engagement with a screw shaft 42 which is selectively driven in either a clockwise or counter clockwise direction by a reversible electric motor 43, the cam member being slidably guided during such movements on a fixed guide plate 44. In the same manner the cover closing follower 40 is selectively engageable with a similar cam member 45 which is actuable into and out of engagement by a reversible screw 46 and driving motor 47. Electric power for operating the cam actuating motors 43 and 47 may be supplied as in the case of the sprocket driving motors from the "live" rail 9 of each trackway, with suitable switching means (not shown) controlled from the central work area W. It will be understood that the cover actuating cam means shown in FIG. 6 will be duplicated at desired distances along the trackways so that each pallet cover can be actuated to its open or closed position in response to movement of the pallets therealong for only a reasonably short distance.

In addition to the outer imperforate covers 37, each pallet is preferably provided with an inner, perforate or screen type cover 50, such as shown in FIG. 3, to protect the crops from birds and the larger size insects. Although power-actuating means for also opening and closing these screen type covers could be provided, since they would not normally need to be removed while the pallets are out in the growing area A, they may simply be arranged to snap into place around their lower periphery within the upper open sides of the pallets 8.

Means, as illustrated schematically in the form of an electric heating element 51 in FIGS. 2 and 3, are provided in the covers for maintaining suitably warm temperatures for the growing of crops when the ambient temperature in the area G drops below safe levels. Electric power for supplying the heating elements may also be taken from the "live" rail 9, and suitable switching means (not shown) may be provided therefor in the central work area W.

FIG. 3 also schematically shows an arrangement for taking up slack in the conveyor chain 7 by adjustably and resiliently biasing the sprocket 16 in the direction of the arrow 54. For such purpose, the sprocket, together with its driving means (20, 21 and 22 in FIG. 4), are mounted on a block 55 which is slidably supported on a mounting bed 56. An adjusting screw 57 extends through a nut 58 fixed to the mounting bed and engages one end of a coil compression spring 59, whose other end abuts against the block 55.

Referring now to FIG. 8 showing a plan view of the central work area W, a relatively short portion of one trackway 60 is arranged to pass adjacent pallet emptying filling, seeding, watering and fertilizing stations, 61, 62, 63, 64 and 65, respectively. At the pallet emptying station 61, for example, the pallets 8 returning with fully grown crops from the crop growing area may be emptied of their contents by dumping them onto a crop conveying belt 66 which has perforations of a size to retain the grown crops thereon but which allows the soil dumped from the pallet to pass through to a lower soil-conveying belt 67. Continuous movement of the crop-carrying belt 66 in the direction of the arrows 68 may be provided during this operation so that the crops thereon are delivered to successive connecting belts 69 and 70, leading to a shipping deck 71 on which containers 72 may be arranged in which to pack and ship the crops as they are harvested. The soil-carrying belt 67 may also, in turn, be driven continuously in the direction of the arrows 73 so as to carry the dumped soil under the trackway 60 and upwardly to a connecting trackway 74, from which the soil can be transferred to a third conveyor belt 75 leading above and adjacent to the next empty pallet, so as to discharge the soil thereinto before passing under the trackway 60 for connection with a fourth belt 76 leading back to the first belt 67.

After soil has been added thereto at the pallet filling station 62, each pallet advances further along the trackway 60 to the seeding station 63, at which the soil bed within the pallet is planted with seeds or seedlings for the growing of a second crop therein, either of the same or a different kind from that which has been harvested. Next along the trackway 60 is shown the pallet watering station 64 at which water is added to the soil bed, and adjacent thereto is shown the station 65 at which fertilizer may be added to the soil in the pallet. It will be appreciated that other operations in addition to those shown may be carried on at similar stations within the work area W, such, as for example, the spraying of the soil beds and plants with pesticides, lubrication and other maintenance work on the pallets, etc. In any event the pallets leave the work area W with their soil beds conditioned for growth of the crops during the course of their traversal of the serpentine like route around the growing area G. Rewatering and refertilizing of the soil beds may be required from time to time, and for such purposes the pallets are again brought through the work area W wherein those operations are again performed at the stations 64 and 65. Use of the pallet emptying station 61 and pallet filling station 62 would not be made, in other words, except to operate on pallets returning to the work area W with fully grown crops ready for harvesting. Before entering the work area W, at the left side thereof shown in FIG. 8, the outer crop protecting covers 37 on all of the pallets are raised to their open position and, if the contents of the pallets are to be dumped at the emptying station 61, the inner screen covers 50 (FIG. 3) are also removed. Since these covers are relatively light they may be stacked and subsequently carried to the opposite or exit end of the work area W for reinstallation on the pallets before passage thereof out onto the growing area. The elevational height of the trackway portion 60 within the work area W may be different at different stations, according to the convenience and operating conditions best suited for the work being performed at each. For example, if the seeding, watering, fertilizing carried on at station 63, 64 and 65 is to be performed manually, the trackway adjacent those stations would be elevated to approximately waist height. In the case of the pallet emptying station 61 where the contents of the pallets is to be dumped onto the crop carrying conveyor belt 66, the trackway would be substantially elevated as shown in FIG. 5 to accommodate tilting of each pallet laterally of the trackway into substantially an inverted position, as about the axis of a hinge 80 connecting each pallet to the supporting plate 81 on its undercarriage. Suitable retaining means such as a chain connected hook 82 may be used for normally connecting this plate with the opposite side of the pallet. When the hook 82 is disengaged and the pallet is tilted about the axis of the hinge 80, it can be moved laterally and downwardly to the broken line positions shown in FIG. 5. The crops and soil, indicated by the numerals 83 and 84, respectively, which had been contained in the pallet, thus descend onto the crop-carrying conveyor belt 66 whose perforations 85 are of such size as to retain the crops 83 thereon but allow the soil 84 to pass through to the soil-carrying conveyor 67. The soil 84 on the latter is thence carried to the left, as viewed in FIG. 5, under the trackway and upwardly to an elevation above the connecting conveyor 74 (FIG. 8).

In order that all such operations as described may be performed in the central work area W irrespective of the outside weather conditions existing in the crop growing area G, the central work area W is preferably enclosed within a building, the sides of which are indicated by the lines 90, 91, 92 and 93 in FIG. 1.

It will thus be seen that by eliminating the necessity to transport seed, fertilizer and other materials out onto the crop growing area for application to the soil, and instead concentrating all soil preparation and treatment operations within a relatively small central work area, where the harvesting of the crops is also carried out, a very considerable saving in the cost of farming is achieved by the invention. It will also be appreciated that the apparatus shown in the drawings to illustrate the various features of the system are, for the most part, shown in schematic or diagrammatic form in order to enhance the reader's understanding of the principal functions of the various components, and that the designs thereof and their interrelationships in an actual physical embodiment of the invention may vary widely therefrom, without departing from the spirit and scope of the invention as hereinafter claimed. Also, certain of the terms used in the claims, such as "soil" and "seeding" are to be taken in their generic sense. Thus, the term "soil" is meant to include not only earth but any crop-nurturing medium, and the term "seeding" embraces not only the planting of seeds per se, but also of seedlings, starter plants, etc.

Having thus described the invention, what is claimed is:

1. A conveyorized farming system, comprising a work area and a crop-growing area, an endless conveyor means extending through said areas adapted for carrying crop-nurturing soil around a prescribed route, said conveyor means including soil container means for said soil in a linear arrangement coextensive with said endless conveyor means, the major length of said route constituting said crop-growing area extending over external terrain for exposure of said soil to the sun, said work area including means for planting, watering and fertilizing crops in only that portion of said soil container means which is located in said work area, said work area extending along a minor portion of the length of said route, the length of that portion of said route which extends through the growing area being several times larger than the length of the portion of said route extending through said work area, and means for moving said conveyor means around said route, whereby any selected portion of said soil container means may be moved from a location in said work area to a location in said growing area and vice versa, the arrangement of said soil container means on said conveyor means being such that movement of one portion of said container means into said work area results in a substantially equal but different portion of said container means being moved out of said work area into said growing area whereby said soil container means and the crops therein are kept in said growing area except when they are selected by conveyor operation for location in said work area.

2. The system of claim 1, wherein said conveyor means comprises a series of interconnected pallets carrying said soil, crop-protecting covers mounted on said pallets, said covers being selectively actuable to an open position and to a closed position, and means for actuating said covers to and from their open and closed positions, respectively.

3. The system of claim 2, wherein said conveyor includes a chain interconnecting said pallets, said major portion of said route comprising a series of loop sections, each of said sections including a pair of adjacent trackways and an interconnecting turn area, each of said pallets having supporting wheel means rollable on said trackways, and a sprocket engaging said chain at each of said turn areas, said driving means being drivingly connected to at least one of said sprockets.

4. The system of claim 3, wherein said trackways of each loop section terminate adjacent its associated turn area, each of said turn areas includes a stationary platform extending radially outward from the sprocket, and anti-friction elements mounted on each of said sprocket and platform for supporting each successive pallet during the interval between disengagement of its supporting wheel means from one of said adjacent trackways upon entering said turn area and its reengagement with the other of said adjacent trackways upon leaving said turn area.

5. A conveyorized farming system comprising a continuous conveyor extending generally horizontally along a serpentine-like route, a series of pallets carried by said conveyor and located in longitudinally spaced relation therealong, each of said pallets forming an upwardly open chamber for a bed of crop-nurturing soil, driving means for said conveyor, a crop-growing area defining the major portion of said route, a work area defining a minor portion of said route, said work area having stations therein for seeding, watering and fertilizing said soil beds, wherein said conveyor includes a chain interconnecting said pallets, said major portion of said route comprising a series of loop sections, each of said sections including a pair of adjacent trackways and an interconnecting turn area, each of said pallets having supporting wheel means rollable on said trackways, and a sprocket engaging said chain at each of said turn areas, said driving means being drivingly connected to at least one of said sprockets, including crop protecting covers mounted on said pallets, each of said covers being actuable between a closed position on its pallet and an open position thereon, cover actuating means for opening and closing the covers including movable cams located adjacent the trackways, cam-engageable followers carried by the covers, and means for moving said cams into and out of engageable relation with said followers for selectively effecting actuation or non-actuation of said covers to their open or closed positions in response to movement of the pallets along said trackways.

6. The system of claim 5, wherein said work area comprises a building enclosing a portion of one of said trackways, including a pallet emptying station on said one trackway within said building, a soil conveying means extending adjacent and below said one trackway at said emptying station for receiving soil removed from successive pallets, a crop receiving conveyor belt superimposed over said soil conveying means at said emptying station and having perforations of a size accommodating passage therethrough of the soil from said pallets but preventing passage therethrough of grown crops.

7. The system of claim 6, including a pallet filling station within said building at which pallets previously emptied at said emptying station are refilled with soil, said soil conveying means extending adjacent and above said one trackway at said filling station for transfer of soil to said previously emptied pallets, said other stations being spaced along the trackway within said building for planting, watering and fertilizing the soil in successive pallets prior to their movement out of the building onto said exterior trackways for the growing of crops.

8. The system of claim 7, wherein said trackway portion within the building is elevated above the crop receiving conveyor belt at said emptying station, and said pallets are tiltable in a direction laterally of said trackway portion for discharging onto said crop receiving belt the crops and soil contained in each pallet while located in said emptying station.

9. The invention of claim 8, including conveyor tensioning means in at least one of said turn areas, said tensioning means comprising a support, a sprocket carrying member slidably mounted for movement relative to said support, and means for adjustably shifting said member relative to said support in a direction to increase tension in said chain, said shifting means including means biasing said member in a direction to increase the tension in said chain.

* * * * *